Figure 1:
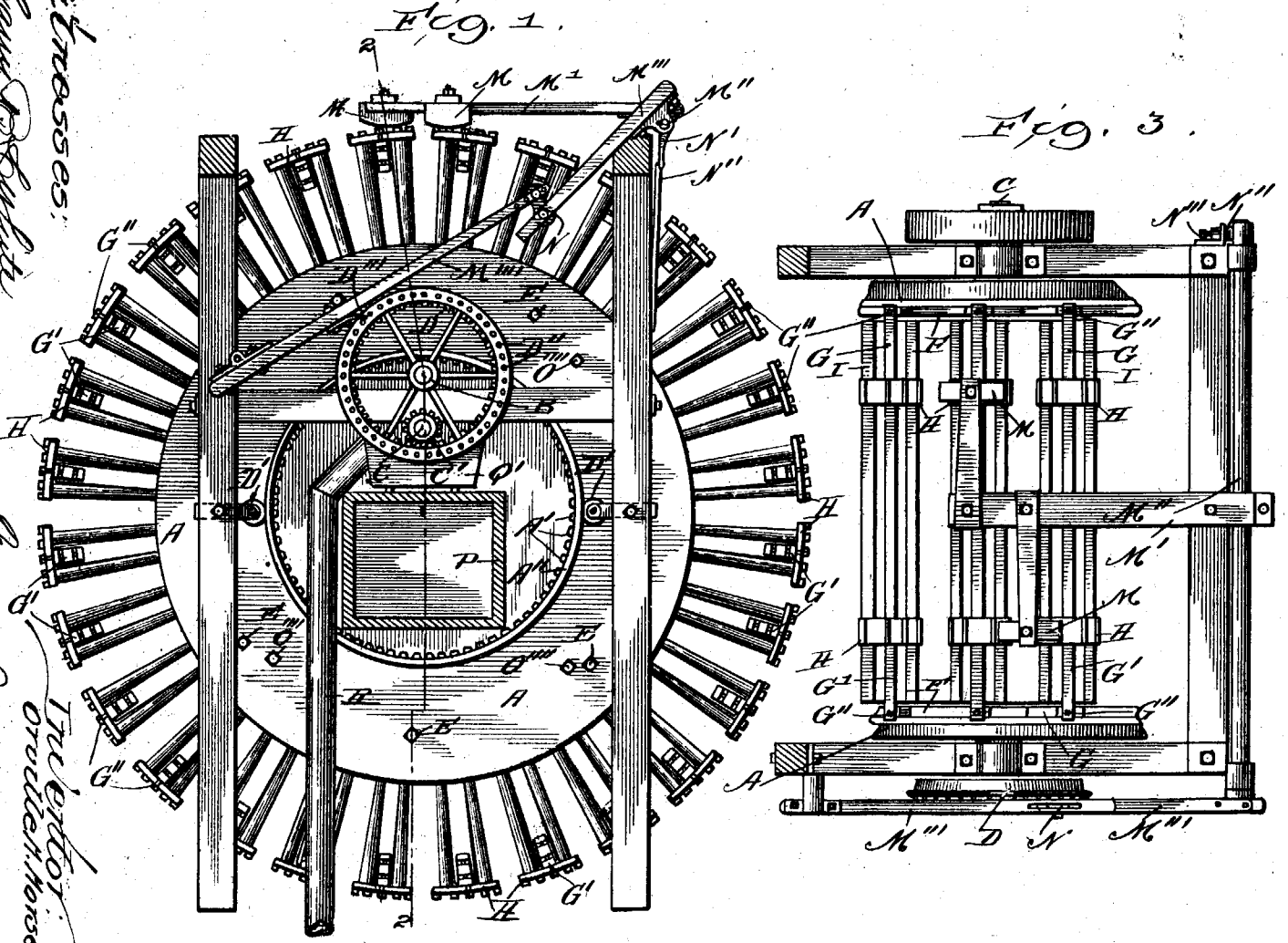

No. 12,102. REISSUED MAR. 17, 1903.

O. M. MORSE.

DUST COLLECTOR.

APPLICATION FILED MAR. 27, 1902.

3 SHEETS—SHEET 1.

Witnesses:
Harry D. Corbite
Ray White

Inventor:
Orville M. Morse
By Joseph Bain Atty

THE ECKERT LITHOGRAPHING CO., WASHINGTON, D. C.

No. 12,102. REISSUED MAR. 17, 1903.

O. M. MORSE.

DUST COLLECTOR.

APPLICATION FILED MAR. 27, 1902.

3 SHEETS—SHEET 2.

Witnesses:
Harry C. Lehlite
Ray White

Inventor
Orville M. Morse.
By Fred Gunn
Atty.

THE ECKERT LITHOGRAPHING CO., WASHINGTON, D. C.

No. 12,102. REISSUED MAR. 17, 1903.
O. M. MORSE.
DUST COLLECTOR.
APPLICATION FILED MAR. 27, 1902.
3 SHEETS—SHEET 3.
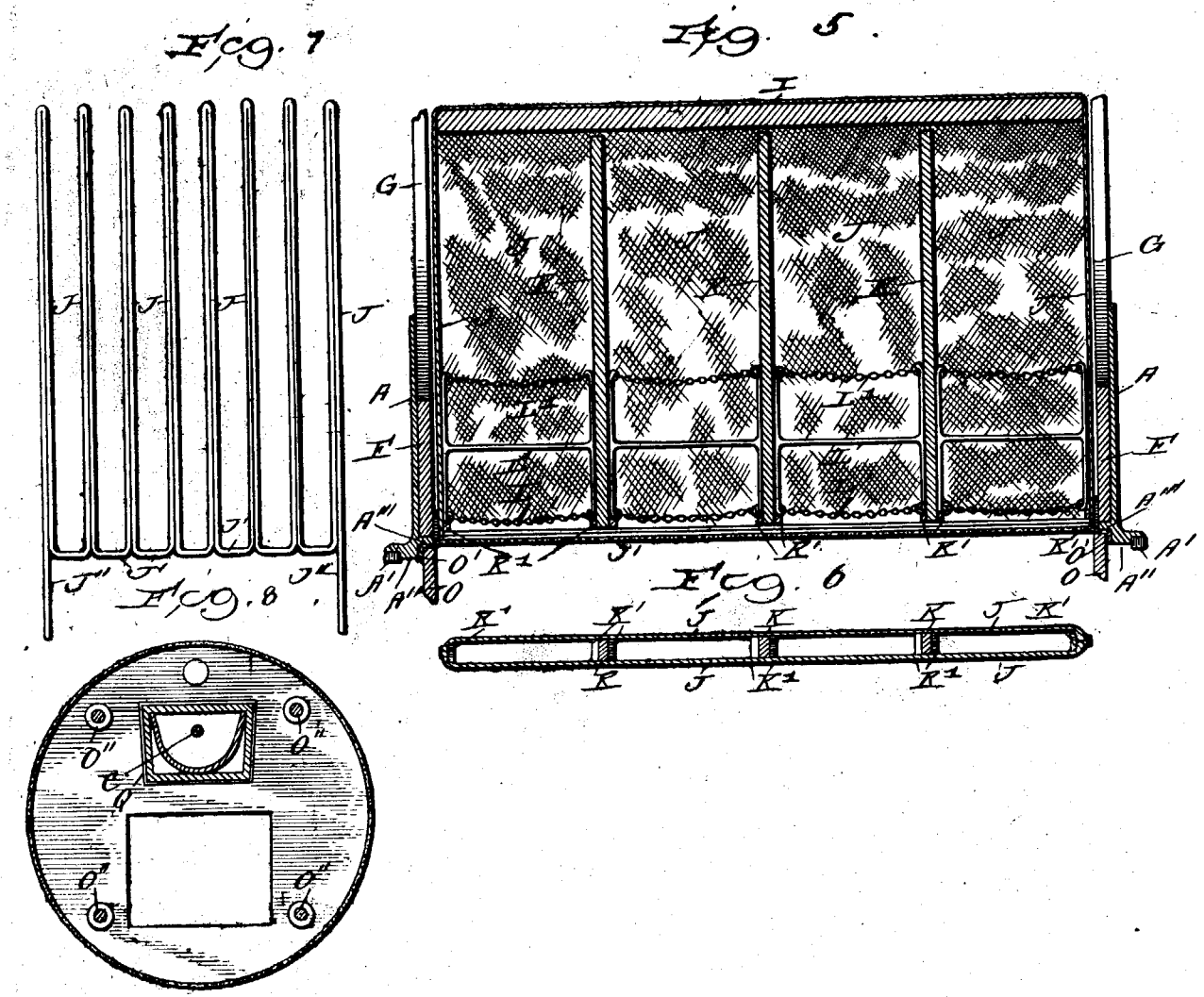
Witnesses
Harry R. White
Roy White
Inventor
Orville M. Morse
By Jones & Bain
Atty.

UNITED STATES PATENT OFFICE.

ORVILLE M. MORSE, OF JACKSON, MICHIGAN.

DUST-COLLECTOR.

SPECIFICATION forming part of Reissued Letters Patent No. 12,102, dated March 17, 1903.

Original No. 675,397, dated June 4, 1901. Application for reissue filed March 27, 1902. Serial No. 100,334.

*To all whom it may concern:*

Be it known that I, ORVILLE M. MORSE, a citizen of the United States, residing at Jackson, in the county of Jackson and State of Michigan, have invented certain new and useful Improvements in Dust-Collectors; and I do hereby declare the following to be a full, clear, and exact description of the invention, such as will enable those skilled in the art to which it appertains to make and use the same.

My invention relates to improvements in dust-collectors, and more particularly to the class of dust-collectors having a series of radial pockets of air-filtering material revolving around a conveyer to receive the collected dust and provided with mechanism to discharge the dust from the pockets into the conveyer.

The objects of my invention are to provide more effective means of discharging the dust from the pockets, to reduce the noise made by the jarring mechanism, to provide improved means of adjusting the parts, to provide for adjustment of the parts while the machine is running, and to provide the device with various improved details of construction, as hereinafter more fully described, and particularly pointed out in the claims.

My invention consists in imparting to the supports normally holding the filtering fabric composing the walls of the pockets under uniform tension a peculiar movement and vibration, whereby the tension of the fabric is alternately suddenly increased and reduced relative to the normal tension to varying degrees throughout the extent of the filtering-walls, in so arranging the filtering and jarring instrumentalities that the direction of tension is alternately varied, whereby the meshes of the filtering fabric are distorted and diagonally distended in opposite directions under the influence of the unbalanced strains thereon, in making the pockets in detachable sections, each section consisting of a number of pockets formed of a continuous strip of filtering material, providing the pockets with sliding cleaners, connecting the pockets in pairs to rocker-bars, whereby two pockets are acted upon simultaneously by the knockers, arranging the knockers to act diagonally upon the pairs of pockets, whereby the fabric comprising the respective pockets will be diagonally obliquely vibrated by the effect of the blow of the knocker when applied at each outer corner of each pocket alternately and successively as the device is rotated, connecting the pockets to annular heads having internal gears and bearings and supporting the heads upon a counter-shaft having pinions engaging the gears, said pinions having hubs engaging the bearings, providing the annular heads with non-rotating heads having suitable packing and yieldingly pressed against the rotating annular heads by springs, and in various details of construction and arrangements of parts, as will more fully appear by reference to the accompanying drawings, in which—

Figure 2:
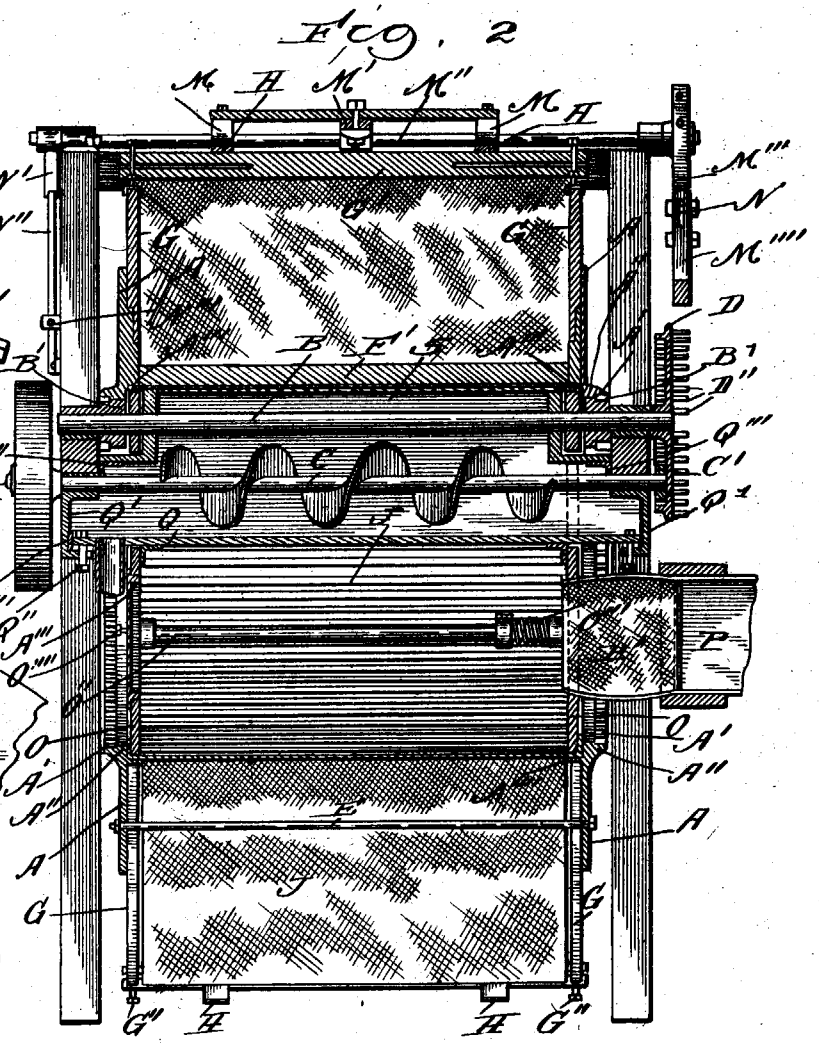
Figure 4:
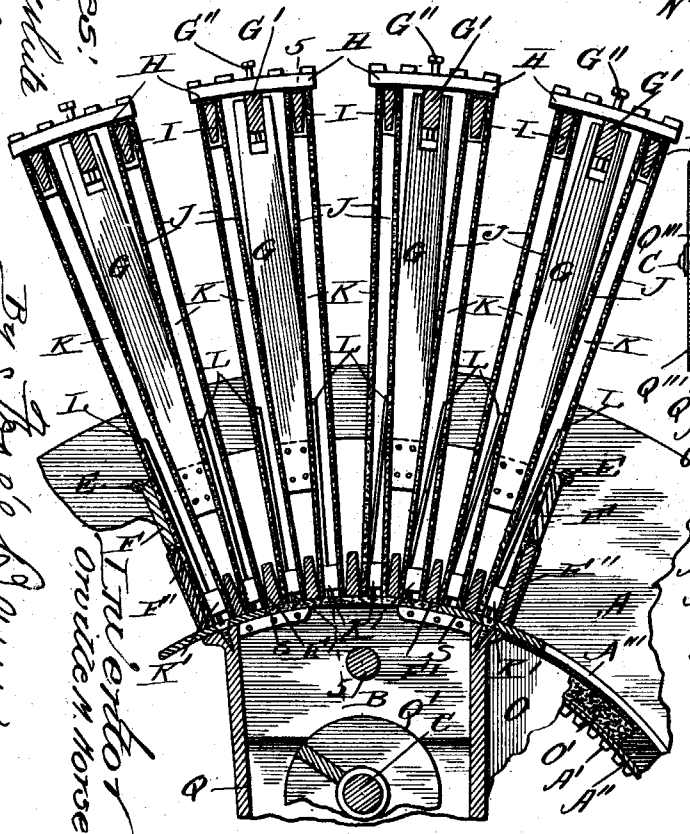

Figure 1 is an end elevation of a device embodying my invention; Fig. 2, a vertical section of the same on the line 2 2 of Fig. 1; Fig. 3, a plan view of the vibrating and jarring mechanism; Fig. 4, an enlarged detail of one section of the pockets shown in vertical section; Fig. 5, a detail of one of the pockets shown in section on the line 5 5 of Fig. 4; Fig. 6, a transverse section of a pocket, taken on the line 6 6 of Fig. 5; Fig. 7, a detail showing the construction of a series of pockets, and Fig. 8 a detail showing the inner side of a non-rotating head.

Like letters refer to like parts in all the figures.

A A are two annular heads, preferably of cast-iron. These heads are provided with internal gears A′, outwardly-projecting flanges surrounding the openings in the heads, and internal bearings A″ in the plane of the pitch-line of the gears A′.

B is a counter-shaft provided with pinions B′, the teeth of which pinions engage the gears A′, and the hubs of the same engage the bearings A″, and thus serve as rolls to support the heads, and also have a diameter the same as the pitch diameter of the pinions, whereby the pinions properly engage the gears.

C is a conveyer-shaft, which also serves as a driving-shaft.

C′ is a pinion on the shaft C, engaging an internal gear D on the shaft B to rotate the latter.

D′ represents guides engaging the flanges on the heads A to cause the heads to rotate about a central fixed axis. The heads A are thus supported and rotated by the shaft B and driven equally by the respective pinions B'.

Between the heads A are clamped the sections of radial filtering-pockets by means of bolts E. At each longitudinal end of a section of pockets is a segment F, which segments are connected near their inner or concave edges by a series of cross-bars F' F'', arranged equidistant from each other, the spaces between these bars constituting the openings to the respective pockets. Opposite each alternate bar F' and extending radially from the outer or convex edge of the segment F are arms G, having recesses in their outer ends, in which recesses are adjustable cross-bars G', radially adjusted by screws G'' and provided with rounded outer edges engaging and supporting and forming fulcrums for rocker-blocks H, to the respective ends of which blocks are attached the successive pairs of pockets, the outer ends of which pockets are provided with transverse strips I to support the same. The bars G' are divided longitudinally at each end for a portion of their length to make them somewhat yielding to increase the vibration of the pockets and further reduce the noise.

The filtering-cloth forming a section of pockets consists of a single continuous strip of material, first arranged as shown in Fig. 7, being folded upon itself at intervals, so as to form the respective pockets J, leaving enough material J' between each pocket to properly extend across the inner face of one of the bars F' and sufficient material J'' at each end to cover the outer bars F'' of each section, and thus form a packing to insure a tight joint between the sections. To complete the respective pockets, the folded portions J are sewed at the edges, as shown in Fig. 6, thus forming a series of pockets connected by the portions J'. The outer surfaces of these outer bars are in radial planes and abut against each other. I am thus enabled to make a whole section of pockets of one continuous strip of filtering material, which not only serves to form the pockets, but also forms packing between the sections and on the inner surfaces of the dividing-bars F' F''. When assembled, the interior surface of the ends of these sections engage flanges A''' on the heads A to hold the sections concentric to the axis of the heads and form a tubular inner surface of the bars F' F'', having a surface composed of the filtering material, between which bars are the open mouths of the various pockets.

To prevent undue expansion or contraction of the pockets by the air-pressure, I provide radial stay-strips K at intervals, to which the sides of the pockets are secured.

To more effectually remove the adhering dust from the inside of the pockets, I provide sliding cleaners consisting of suitable H-shaped wire frames L, to the opposite arms of which frames are attached small chains L', having sufficient slack to conform to any curvature of the sides of the pockets. These frames fit loosely and slidably in the pockets and traverse the same by gravity, being retained in the pockets by stops K'. These cleaners shift from side to side of the pockets, traversing each side of the same alternately as the pockets revolve. These chains serve to remove the dust adhering to the interior of the pockets. For further means for discharging the dust from the pockets I provide knockers M, attached to an arm M', operated by a rock-shaft M'', vibrated by an arm M''', connected to a pivoted lever M'''', vibrated by pins D'' on the wheel D, and engaging a suitable projection D''' on said lever. For varying the stroke of the knockers I provide an adjustable connection N between the arm M''' and lever M''''. To further adjust the force of the stroke of the knocker, the rock-shaft M'' is provided with an arm N', engaged by a spring N'', adjustable for tension by a screw N'''. These knockers engage the rocker-blocks and are arranged at different distances from the pivot of the shaft M'', whereby they act alternately on the pockets and at opposite ends of the same.

The openings in the annular heads A are closed by non-rotating heads O, provided with packing O' near the periphery, which packing engages the inner edge of the head A and the flange A''' and forms an air-tight joint. To press the heads O outward and maintain this joint, rods O'' extend between the heads O and are inserted and longitudinally movable in the bosses on the heads. A spring O''' on each rod engages a collar on the rod and a boss on the head and presses the heads O apart, and to adjust the tension of these springs while the machine is running set-screws O'''', engaging the ends of the rods O'', are provided.

An air-pipe P conveys the dust-laden air to the machine, and to permit the free movement of the head O a longitudinally-yielding or elastic section P' is provided, made of canvas or other yielding material and attached at its respective ends to the pipe P and the head O.

The conveyer-trough Q is provided with a concavo-convex top S, having a central opening to receive the dust discharged from the pockets, and it is also provided with fixed ends Q', attached to the frame. The body of the trough is detached from these fixed ends and made vertically adjustable by means of screws Q'', the joint between the head Q' and trough Q being closed by suitable packing Q'''. An exhaust-pipe R extends from the conveyer-trough to any convenient exhaust means, preferably to the fan that drives the dust-laden air into the machine.

The operation of my device is as follows: The dust-laden air passes into the axis of the machine through the pipe P and yielding section P' and under pressure enters all of the pockets except those over the conveyer-trough, which latter are cut off by the concavo-convex top S. This air escapes through the pores of the filtering material of the pockets, leaving the dust on the inner surface thereof. As the pockets revolve the chains L traverse the inner surface of the pockets by gravity and release the dust from the same. As the pockets come over the openings in the concavo-convex top of the conveyer-trough this dust is discharged into the conveyer and removed from the machinery thereby. To further effect this discharge of dust from the pockets, the knockers M vibrate the pockets and by the peculiar action heretofore described are made quite effective. The knocker farthest from the rock-shaft first engages the advancing end of the rocker-block at that side. This depresses one end of one pocket and raises the corresponding end of the opposite pocket, decreasing the tension of one pocket below normal and raising the tension of the corresponding above normal, the rocker-block tilting on the supporting-bar G′ as a fulcrum. The fabric composing the pocket upon which the blow is struck is thus loosened or collapsed to a greater or less extent, and the meshes thereof resume their normal lateral dimensions to some degree for a short space of time, while the material composing the companion pocket of the pair is thereby and simultaneously subjected to an abnormal tension. As the pockets move forward the other knocker comes into action at the other end of the other pocket and acts at the opposite end of the other pocket of the pair and increases the tension of the pocket previously collapsed to a degree above normal. A sort of diagonal wave of vibration is thus set up in the material, due to the irregular distribution of tension, which causes the meshes of the fabric to change their shape, becoming relatively longitudinally elongated or relatively expanded under the varying strains. The distribution of the tension being irregular, the alteration of the shape of the meshes will take place to some degree irrespective of the direction in which the threads of the fabric are arranged, which is very effective, and the knockers do not in a measure neutralize each other, as they would if arranged in line. The knockers also strike a yielding rocker-block and do not thus make as much noise as when striking directly over a supporting-bar. The pockets while thus subjected to the action of the knockers and over the opening in the concavo-convex top of the conveyer-trough are also subjected to an exhaust or reversed pressure of air, due to exhausting the air from the conveyer-trough through the pipe R. This further facilitates the discharge of the dust from the pockets.

The various adjustments of the bars G′ to adjust the tension of the pockets, of the conveyer-trough to maintain a close contact of its concavo-convex surface S and the bars F′ F″, and of the heads O to maintain a tight joint around the same are all easily made while the machine is running by turning the respective screws for these purposes.

Having thus fully described my invention, what I claim, and desire to secure by Letters Patent, is—

1. The combination of a cylinder having an annular head, an internal bearing, an outwardly-projecting flange, and an internal gear surrounding the opening of the head, the diameter of the bearing being the same as the pitch diameter of the gear, a shaft in the opening of the head, a pinion on the shaft to engage the gear, and a hub of the pitch diameter of the pinion and engaging the bearing, substantially as described.

2. The combination of annular heads, dust-collecting pockets attached to the heads, internal gears and bearings surrounding the openings of the heads, a shaft in said openings, pinions on the shaft engaging the internal gears and having hubs engaging the bearings and supporting the heads, and means for rotating the shaft, substantially as described.

3. The combination of annular heads, dust-collecting pockets attached to the heads, internal gears, bearings, and flanges on the heads, a shaft in the openings of the heads and supporting the heads, means for rotating the shaft, pinions on the shaft engaging the gears and having hubs engaging the bearings and supporting the heads, and guides engaging the flanges, substantially as described.

4. In a dust-collector, annular heads, a series of radial dust-collecting pockets attached to the heads, a conveyer-trough having a convex top engaging the inner ends of the pockets, a conveyer-shaft, and a counter-shaft extending through the conveyer-trough, gearing connecting the said shafts, and gearing connecting the counter-shaft and the respective annular heads, substantially as described.

5. The combination of annular heads, radial dust-collecting pockets attached to the heads, internal gears and bearings, and external flanges on the heads and supporting the heads, a shaft in the openings of the heads, pinions on the shaft and engaging the gears, and having hubs engaging the bearings, means for rotating the shaft, guides engaging the flanges, a conveyer having a convex upper surface engaging the pockets and having an opening to receive the dust, and non-rotating heads closing the openings in the annular heads, substantially as described.

6. The combination of annular heads, radial dust-collecting pockets attached to the heads, internal gears and bearings, and external flanges, on said heads and surrounding the openings therein, guides engaging the flanges, a counter-shaft supporting the heads and extending through the same, pinions on the shaft and engaging the gears and having hubs engaging the bearings, a conveyer-shaft geared to the counter-shaft, a conveyer-trough having a convex top engaging the inner end of the pockets and having an opening to receive the dust, heads closing the openings in the annular heads, and means for admitting air to the pockets, substantially as described.

7. The combination of annular heads, radial dust-collecting pockets attached to the heads and opening into an interior cylinder-chamber, a conveyer-trough in said chamber having a convex top engaging the pockets and having an opening to receive the dust, circular heads closing the openings in the annular heads, packing between the annular and circular heads, rods between the circular heads, set-screws engaging the ends of the rods to force the heads apart, and means for admitting air to the interior of the pockets, substantially as described.

8. In a dust-collector, a closed cylinder consisting of annular rotating heads, a series of radial pockets attached to the same, the inner ends of said pockets forming a slotted concave surface, circular heads closing the openings of the annular heads, packing between the circular and annular heads, rods between the circular heads, collars on the rods, and springs engaging the collars and one of the heads, substantially as described.

9. In a dust-collector, in combination with annular heads, radial dust-collecting pockets, circular heads closing the openings of the annular heads, packing between the circular heads and the annular heads, rods between the circular heads and movably inserted in bosses on said heads, collars on the rods, springs on the rods engaging the bosses and collars, and set-screws engaging the ends of the rods, substantially as described.

10. In a dust-collector, a series of radial dust-collecting pockets formed in detachable sections, each section consisting of a series of pockets formed of a single continuous strip of filtering material folded at intervals and sewed at the edges and a suitable frame to hold the same in place, substantially as described.

11. In a dust-collector, a continuous series of radial dust-collecting pockets formed in detachable and interchangeable sections; each section consisting of a single continuous strip of filtering material, in combination with segments, cross-bars connecting the segments, strips supporting the outer ends of the pockets, and arms supporting the strips and attached to the segments, substantially as described.

12. In a dust-collector, a detachable section of radial pockets consisting of two segments connected by a series of cross-bars, radial arms attached to the segments, adjustable bars supported by the arms, transverse strips supported by said bars, and a single continuous strip of filtering material forming the pockets, and engaging the cross-bars between the pockets, and supported at the outer ends of the pockets by the strips, substantially as described.

13. In a dust-collector, a detachable section of dust-collecting pockets; consisting of two segments connected by cross-bars, the outer cross-bars having the outer surfaces radial, radial arms opposite each alternate cross-bar, adjustable bars supported in the outer ends of the arms, rocker-blocks supported by the adjustable bars, transverse strips supported by the rocker-blocks, and a continuous strip of filtering material engaging the cross-bars and the transverse strips, and forming the pockets, substantially as described.

14. In a dust-collector, a detachable section of dust-collecting pockets; consisting of a frame composed of two segments, cross-bars at intervals connecting the segments near their concave sides, radial arms opposite each alternate cross-bar, adjustable bars connecting the opposite arms, rocker-blocks supported by the adjustable bars, and a continuous strip of filtering material folded at intervals and sewed at the edges to form the pockets, and having material between the pockets and at each end to engage the cross-bars and form packing for the inner faces and abutting sides of said bars, substantially as described.

15. In a dust-collector, in combination with radial dust-collecting pockets, rocker-blocks connecting the outer ends of the pockets in pairs, bars supporting the rocker-blocks, knockers to strike the said blocks, and a conveyer to receive the dust from the pockets, substantially as described.

16. In a dust-collector, in combination with revoluble radial dust-collecting pockets, rocker-blocks arranged in pairs and connecting the outer ends of the pockets in pairs, radially-adjustable bars supporting the rocker-blocks, radial supports for the bars, knockers to engage the rocker-blocks at diagonally opposite ends of each pair, and a conveyer to receive the dust discharged from the pockets, substantially as described.

17. In a dust-collector, in combination with a series of revoluble radial dust-collecting pockets, rocker-blocks connecting the outer ends of the same in pairs and supporting the outer ends thereof, radially-adjustable bars supporting the rocker-blocks and divided longitudinally at each end, radial supports for the bars, knockers to engage the rocker-blocks, and a conveyer to receive the dust from the pockets, substantially as described.

18. In a dust-collector, a series of revoluble radial dust-collecting pockets, and cleaners slidably on the inner surface of said pockets, and supported thereby, substantially as described.

19. In a dust-collector, a series of revoluble radial dust-collecting pockets, frames freely slidable in said pockets and supported thereby, and chains attached to said frames and traversing the inner surface of said pockets, substantially as described.

20. In a dust-collector, a series of revoluble radial dust-collecting pockets, H-shaped frames slidable in said pockets, stops to retain the frames in the pockets, and chains attached at their respective ends to the arms of the frame, substantially as described.

21. In a dust-collector, the combination of a revoluble series of dust-collecting pockets, frames freely movable in said pockets, and alternately engaging and traversing the respective inner sides of the pockets, and supported thereby, and chains attached at their respective ends to said frames, substantially as described.

22. In a dust-collector, a series of radial dust-collecting and revolving pockets, yielding supports for the outer ends of the pockets, knockers to engage the supports, cleaners slidable in said pockets, and traversing the interior of the same by gravity, substantially as described.

23. In a dust-collector, a series of revoluble radial dust-collecting pockets, yielding supports for the outer ends of the pockets, knockers to engage the supports, frames slidable in said pockets, chains attached to the frames and traversing the interior of the pockets, and means for removing the dust discharged from the pockets, substantially as described.

24. In a dust-collector, the combination of a series of revoluble radial dust-collecting pockets, rocker-blocks arranged in pairs and supporting the pockets in pairs, bars supporting the rocker-blocks, radial supports for the bars, and knockers arranged to simultaneously engage opposite ends of a given pair of rocker-blocks, and means for operating the knockers, substantially as described.

25. In a dust-collector, a series of radial dust-collecting and revolving pockets, rocker-blocks arranged in pairs and connecting the pockets in pairs, radially-adjustable bars supporting the rocker-blocks, radial supports for the bars, a rock-shaft, means for operating the rock-shaft, an arm attached to the rock-shaft, and knockers attached to the arm at different distances from the rock-shaft and engaging the rocker-blocks, substantially as described.

26. The combination of a conveyer-shaft, a counter-shaft, gears connecting the said shafts, pins in one of the gears, a series of dust-collecting pockets rotated by the counter-shaft, and supported and connected in pairs at their outer ends by rocker-blocks, a pivoted lever having a projection engaged by said pins, a rock-shaft having an arm adjustably connected to the pivoted lever, an arm attached to the rock-shaft, and knockers attached to said arm and engaging the said rocker-blocks, substantially as described.

27. In a dust-collector, the combination of a frame, a series of radial dust-collecting pockets attached to annular heads, internal gears on the heads, a counter-shaft journaled on the frame, pinions on the counter-shaft engaging the internal gears, a vertically-adjustable conveyer-trough having a convex top engaging the pockets, detached ends to the said trough attached to the frame and having set-screws to adjust the trough, packing between the trough and ends, a conveyer-shaft journaled in the said ends, and gearing connecting the conveyer-shaft and counter-shaft, substantially as described.

28. In a dust-collector, annular heads, a series of radial dust-collecting pockets with their inner ends between the heads, and divided into detachable sections, each section consisting of a number of pockets, segments attached to each segment of pockets and abutting against the adjacent segments, flanges on the heads to engage the concave sides of the segments, and binding-bolts connecting the heads, substantially as described.

29. In a dust-collector, radial dust-collecting pockets connected in pairs by rocker-blocks, bars supporting the rocker-blocks, radial arms having recesses to receive the bars, and set-screws in the end of the bars and engaging the arms to radially adjust the bars, substantially as described.

30. In a dust-collector, the combination of annular heads having internal gears, radial dust-collecting pockets attached to the heads, means for yieldingly supporting the outer ends of the pockets, and means for radially adjusting the same, circular heads to close the openings in the annular heads, packing between the circular and annular heads, springs to press the circular heads outward, a conveyer-shaft, and a counter-shaft connected by gearing, pinions on the counter-shaft supporting the annular heads and engaging the internal gears, a conveyer-trough having a convex surface engaging the inner edges of the pockets and having an opening to receive the dust, means for admitting air to the pockets, and means for exhausting the air from the conveyer-trough, substantially as described.

31. In a dust-collector, radial dust-collecting and rotative pockets, rocker-blocks pivotally supported at the middle and arranged in pairs and connecting the pockets in pairs, a rotating wheel having a series of pins, a pivoted lever having a projection engaged by the pins, a rock-shaft having an arm adjustably connected to the lever, an arm on the rock-shaft having attached knockers arranged at different distances from the rock-shaft, an arm on the rock-shaft and a spring engaging the arm, substantially as described.

32. In a dust-collector, annular heads, a counter-shaft supporting and rotating said heads, a conveyer-shaft geared to said counter-shaft, radial dust-collecting pockets attached to the heads, yielding supports for the outer ends of said pockets, knockers to engage said supports, means for operating said knockers, heads closing the openings in the annular heads, a closed conveyer-trough connected to the pockets in succession, means for admitting air to the pockets, and means for exhausting air from the conveyer-trough and the pockets connected therewith, substantially as described.

33. In a dust-collector, a pair of companion pockets, means for supporting said pockets under tension including a movable rocker-block common to both pockets, and means for varying the position of the rocker-block to simultaneously increase the tension of one pocket and diminish the tension of the other.

34. In a dust-collector a pair of companion pockets, rocker-blocks supporting both of said pockets at each end, a yielding fulcrum-support for said rocker-blocks, adapted to maintain the pockets under tension, and means for alternately depressing the opposite ends of the opposing rocker-blocks, for simultaneously varying the relative tensions of the opposite ends of both fabric pockets and causing diagonal vibrations therein.

35. In a dust-collector a series of radial dust-collecting pockets composed in part of reticulated material, rocker-blocks connecting the outer ends of said pockets in pairs, fulcrum-supports for said rocker-blocks, means for holding said pockets under normal tension, and a mechanism for depressing the ends of said levers alternately whereby the normal tension of one of the pockets is decreased and the normal tension of the associate pocket is simultaneously increased for vibrating said pockets.

36. In a dust-collector, a fabric pocket open at the dust-receiving end, a strip associated with the opposite end for holding said pocket transversely distended, a rocker-block connected at one end with the strip, a fulcrum for said rocker-block, a means for holding the rocker-block in position to maintain the pocket under normal tension, and a knocker arranged and adapted to sharply strike the rocker-block and thereby suddenly move the same to first abruptly increase the tension of the pockets above normal, and then permit its return to normal tension In testimony that I claim the foregoing as my own I affix my signature in presence of two subscribing witnesses.

ORVILLE M. MORSE.

Witnesses:

LELIA R. KNOWLES,

R. D. KNOWLES.